United States Patent
Larsen et al.

[11] Patent Number: 5,897,169
[45] Date of Patent: Apr. 27, 1999

[54] SEAT BELT WEBBING GUIDE

[75] Inventors: Paul S. Larsen, Ortonville; Diane M. Valitutti, Macomb, both of Mich.

[73] Assignee: Chrysler Corporation, Auburn Hills, Mich.

[21] Appl. No.: 08/911,803

[22] Filed: Aug. 15, 1997

[51] Int. Cl.⁶ .................................................. B60R 22/26
[52] U.S. Cl. ........................................ 297/483; 280/808
[58] Field of Search .................................. 297/468, 483, 297/484; 280/808

[56] References Cited

U.S. PATENT DOCUMENTS

| | | | |
|---|---|---|---|
| 3,471,197 | 10/1969 | Ely | 297/483 X |
| 3,844,001 | 10/1974 | Holmberg | 297/483 X |
| 3,869,097 | 3/1975 | Peel et al. | 242/107 |
| 3,915,495 | 10/1975 | Oehm | 297/388 |
| 4,142,274 | 3/1979 | Scholz et al. | 24/163 R |
| 4,529,249 | 7/1985 | Ino | 297/474 |
| 4,568,107 | 2/1986 | Yokoyama | 280/807 |
| 4,648,625 | 3/1987 | Lynch | 297/483 X |
| 4,730,875 | 3/1988 | Yoshitsugu | 297/483 X |
| 4,944,557 | 7/1990 | Tsubai | 297/483 X |
| 5,022,677 | 6/1991 | Barbiero | 280/801 |
| 5,263,741 | 11/1993 | Seros et al. | 297/483 X |
| 5,364,170 | 11/1994 | West | 297/483 |
| 5,372,382 | 12/1994 | Whitens | 280/808 |
| 5,390,982 | 2/1995 | Johnson et al. | 297/410 |

FOREIGN PATENT DOCUMENTS

| | | | |
|---|---|---|---|
| 3519346 | 12/1986 | Germany | 297/483 |
| 191148 | 11/1982 | Japan | 280/808 |
| 229744 | 9/1989 | Japan | 280/808 |

*Primary Examiner*—Peter R. Brown
*Attorney, Agent, or Firm*—William J. Coughlin

[57] ABSTRACT

An apparatus for guiding a seat belt webbing includes a mounting portion and a guiding portion. The mounting portion preferably includes an aperture adapted to receive a vertical post for conventionally mounting a head rest to a vehicle seat back. The guide portion defines an opening for receiving the seat belt webbing. In the preferred embodiment, the opening is defined by a fixed arm and movable arm interconnected by a living hinge.

13 Claims, 2 Drawing Sheets

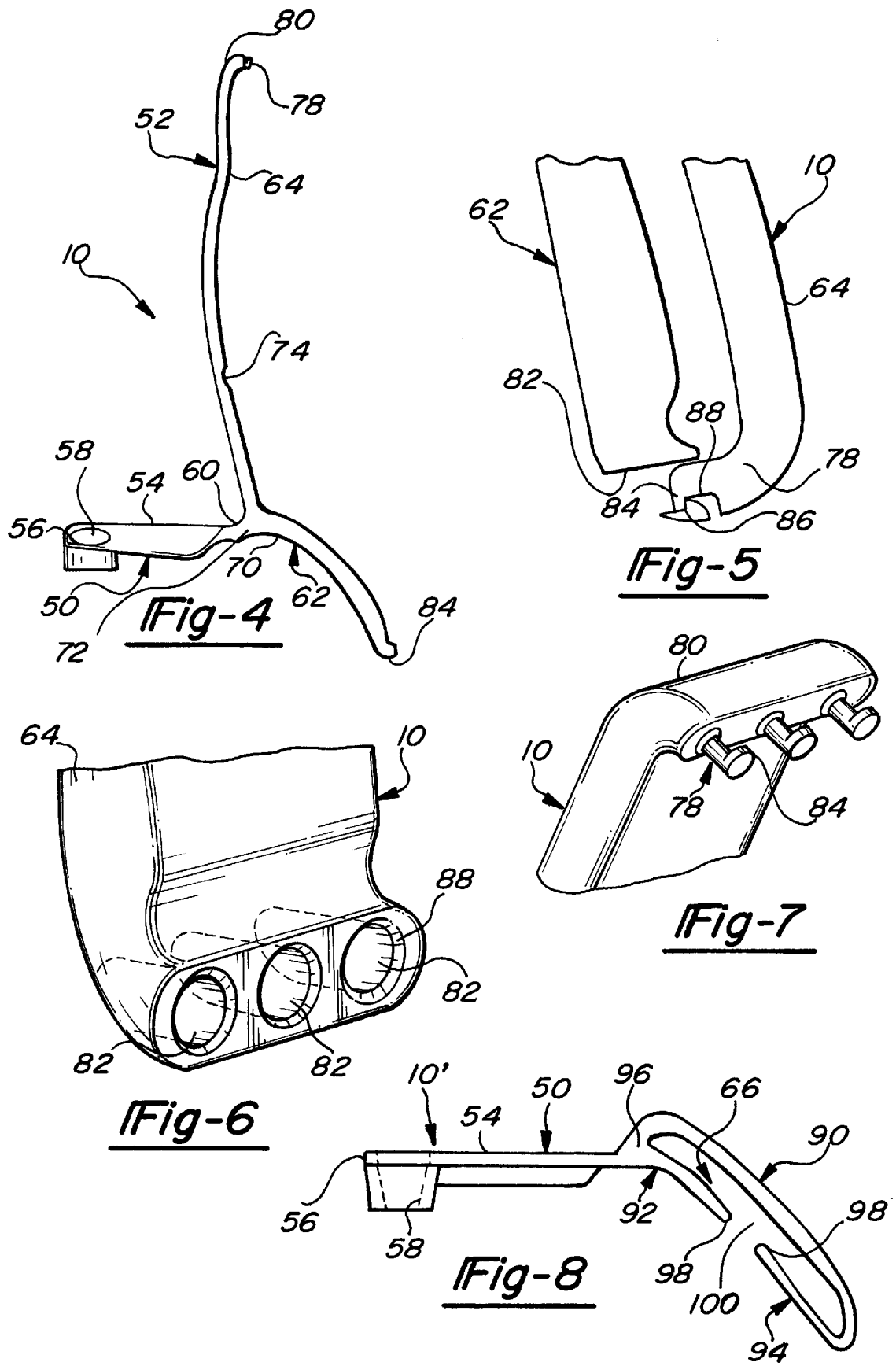

SEAT BELT WEBBING GUIDE

BACKGROUND OF THE INVENTION

1. Technical Field

The present invention generally relates to safety restraints for motor vehicles. More particularly, the present invention relates a seat belt webbing guide for positioning an upper portion of a shoulder belt of a motor vehicle.

2. Discussion

Vehicle occupant restraint systems having a seat belt webbing and a guide for guiding the seat belt webbing are well known. In many known vehicle occupant restraint systems, a guide commonly known as a D-ring is attached to a vehicle pillar and vertically adjustable between different positions so that the D-ring and seat belt webbing may be vertically located relative to a particular vehicle occupant. However, a comfortable position of the seat belt webbing may be difficult to attain since the B-pillar may be longitudinally spaced from the vehicle seat. In this regard, the D-ring cannot horizontally travel with the vehicle seat if the seat is adjusted fore and aft. As a result, the seat belt may be difficult to reach (e.g., when the seat is in a foremost position). Additionally, passenger comfort may be compromised as the seat is moved fore and aft.

It is also known to provide a seat belt webbing guide integrally formed with the vehicle seat back. For example, in certain vehicles (e.g., various convertibles), a B-pillar is not present for seat belt webbing or D-ring attachment. Integrally formed webbing guides, while effective, increase production expense and are often considered to negatively effect vehicle styling.

SUMMARY OF THE INVENTION

It is a principal object of the present invention to provide a seat belt webbing guide carried by a vehicle seat which is inexpensive to manufacture and easy to assemble.

It is a more particular object of the present invention to provide a seat belt webbing guide adapted to mount to one of the upwardly extending mounting posts of a vehicle seat head rest.

In one form, the present invention provides an apparatus for guiding a seat belt webbing, including a mounting portion and a guide portion. The mounting portion is adapted for interconnecting the apparatus with a vehicle. The guide portion is interconnected to the mounting portion and defines an opening for receiving the seat belt webbing. The opening is partially defined by a movable arm. The arm is movable between a first position for permitting insertion and withdrawal of the seat belt webbing guide relative to the opening and a second positioning for preventing withdrawal of the seat belt webbing from the opening.

In a more preferred form, the present invention comprises an arrangement for restraining an occupant of a motor vehicle relative to a vehicle seat. The vehicle seat has a head rest attached to a seat back through a pair of vertical posts. The arrangement includes a seat belt webbing guide including a shoulder belt section. The arrangement further includes a seat belt webbing guide for guiding the shoulder belt section. The seat belt webbing guide includes a mounting portion and a guide portion. The mounting portion has an aperture adapted to receive one of the pair of vertical posts of the vehicle seat. The guide portion is interconnected to the mounting portion and defines an opening for receiving the seat belt webbing. The opening is at least partially defined by a fixed arm and a movable arm. A living hinge interconnects the fixed arm and the movable arm.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 4 is a simplified side view of the seat belt webbing guide shown in a fully open position.

FIG. 5 is a fragmentary cross-sectional view of a portion of the seat belt webbing guide illustrating the cooperating portions which maintain the seat belt webbing guide in a closed position.

FIG. 6 is a fragmentary perspective view of a portion of the seat belt webbing guide further illustrating the female portions.

FIG. 7 is a fragmentary perspective view of a portion of the seat belt webbing guide further illustrating the male portions.

FIG. 8 is a front view of a seat belt webbing guide constructed in accordance with the teachings of an alternative embodiment of the present invention.

DETAILED DESCRIPTION OF THE PREFERRED EMBODIMENT

Figure 1:
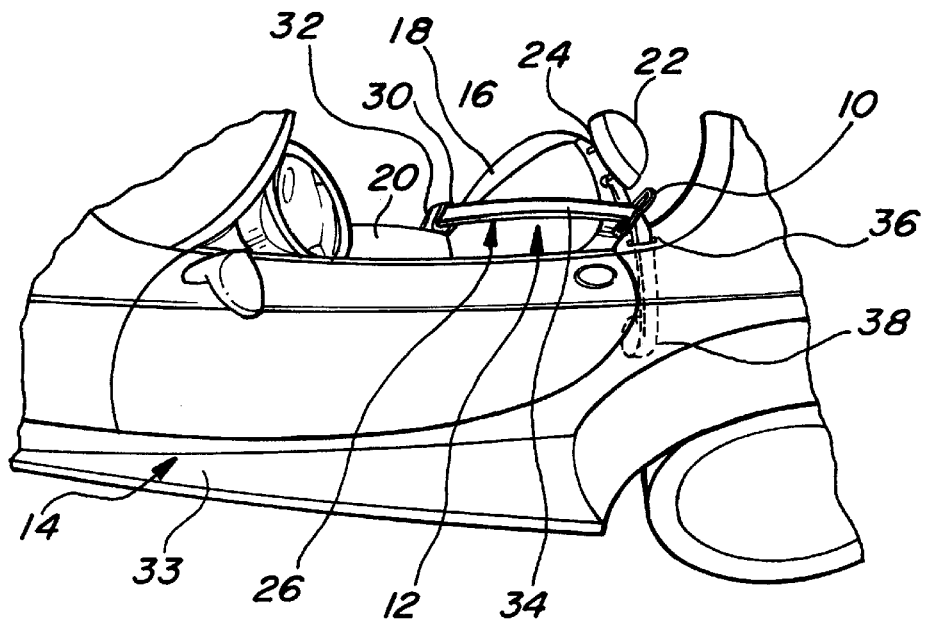
FIG. 1 is a fragmentary view of an exemplary vehicle shown incorporating a seat belt webbing guide constructed in accordance with the teachings of a preferred embodiment of the present invention.
Figure 3:
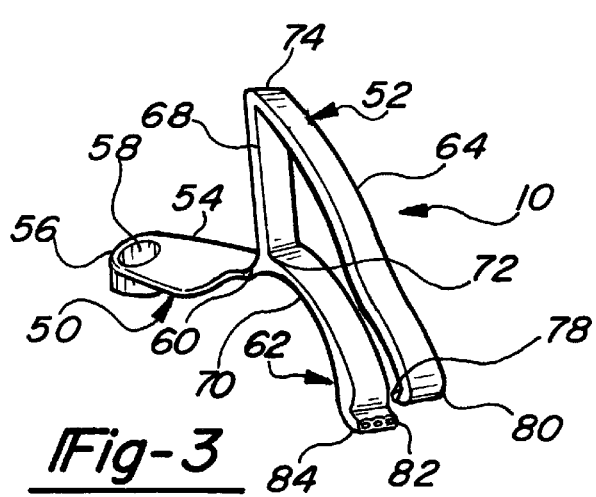
FIG. 3 is an enlarged perspective view of the seat belt webbing guide of FIG. 1.
Figure 2:
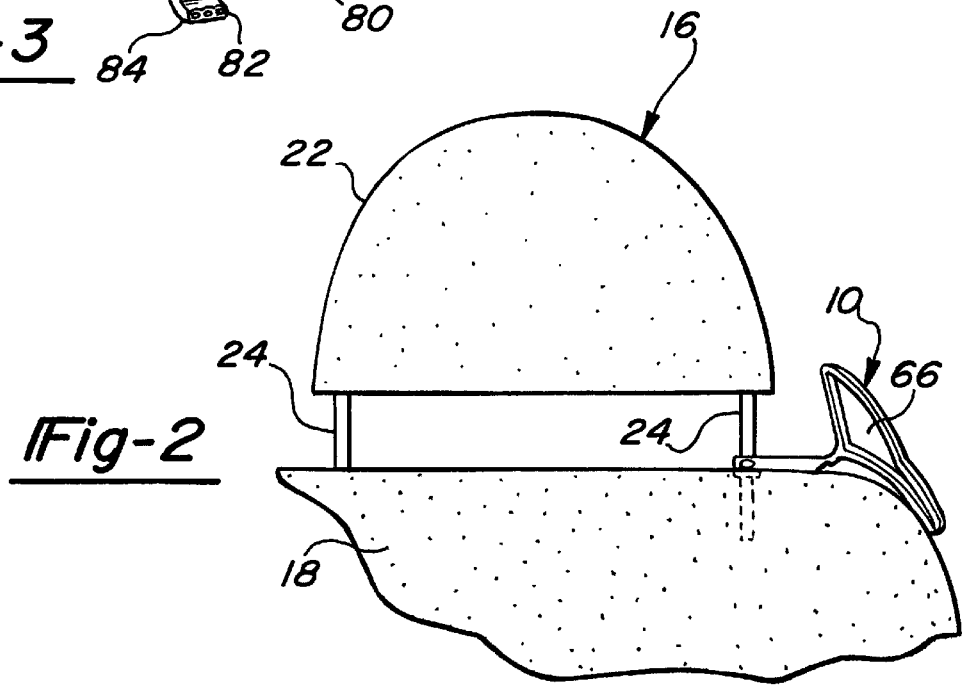
FIG. 2 is an enlarged front view of a portion of the vehicle seat of FIG. 1, further detailing the mounting of the seat belt webbing guide of the present invention on the outboard mounting post for the seat head rest.

With reference to FIGS. 1 and 2, a seat belt webbing guide 10 is illustrated incorporated into an exemplary occupant restraint system 12 of a motor vehicle 14. Prior to addressing the construction and function of the seat belt webbing guide 10, a brief understanding of the occupant restraint system 12 which is otherwise of conventional construction is warranted.

The present invention is illustrated in FIGS. 1 and 2 as applied to a three-point vehicle safety belt system 12 for restraining forward movement of a vehicle occupant in the event of vehicle deceleration above a predetermined magnitude, such as occurs in a vehicle collision. It should be understood that the present invention could be applied to other safety belt systems. As shown in the fragmentary view of FIG. 1, a vehicle seat is illustrated as a front driver seat 16 in the vehicle 14. The vehicle seat 16 is of conventional construction including a seat back 18, a seat cushion 20 and a head rest 22 attached to the seat back 18 by two upwardly extending posts 24.

The vehicle safety belt system 12 includes a length of seat belt webbing 26 which is extendable about the vehicle occupant (not shown) in a conventional manner. A lap belt section 28 of the seat belt webbing 26 has one end (not shown) anchored to the vehicle body at an anchor point and extends across the seat cushion 20 to a tongue assembly 30 received in a buckle 32 secured to the vehicle body 33. A shoulder belt section 34 of the seat belt webbing 26 extends from the tongue assembly 30 diagonally across the seat back 18. The seat belt webbing 26 passes through an opening 36 in the vehicle body 33 and extends vertically downward to seat belt retractor 38 having an pretensioner of any known construction. Since the construction and operation of the seat belt pretensioner are known, such will not be described herein.

With continued reference to FIGS. 1 and 2 and additional reference to FIGS. 3–7, the seat belt webbing guide 10 of the present invention is shown to include a mounting portion 50 and a webbing guide portion 52. The mounting portion 50 is preferably adapted to cooperate with the outboard post 24 for positioning the guide portion 52 relative to the seat back 18. In this regard, the mounting portion 50 includes a transversely extending segment 54 having a first end 56 through which an aperture 58 passes. The aperture 58 is adapted to receive the outboard post 24 and, in turn, enables pivotal movement of the transverse arm 54 about the outboard post 24. The transverse arm 54 includes a second end 60 joined to the guide portion 52.

The guide portion 52 is illustrated to preferably include a fixed arm 62 and a movable arm 64. The fixed and movable arms 62 and 64 cooperate to define an opening 66 for receiving the seat belt webbing 26. The opening 66 narrows as it extends downwardly bottom to prevent twisting of the seat belt webbing 26. The fixed arm 62 includes an upwardly extending segment 68 and a downwardly extending segment 70 which mutually join with the second end 60 of the mounting portion 50 at a joint 72.

The movable arm 64 is pivotally interconnected to the fixed arm 62 through a living hinge 74. The living hinge 74 permits movement of the movable arm 64 between a closed position (as shown in FIGS. 1 and 2) and an open position (partially shown in FIG. 3 and fully shown in FIG. 4). In its closed position, the seat belt webbing guide 10 functions to retain and guide the seat belt webbing 26 within the opening 66. Upon opening the seat belt webbing guide 10, the seat belt webbing 26 may be removed from or inserted into the opening 66.

The seat belt webbing guide 10 further includes a latching arrangement for releasably retaining the movable arm 64 in its closed position. The latching arrangement is shown most clearly in FIGS. 5 through 7 to include a plurality of male portions 78 extending from a distal end 80 of the movable arms 64 and a corresponding plurality of female portions or apertures 82 located in a distal end 84 of the lower segment 70 of the fixed arm 62. In the exemplary embodiment illustrated, the male portions 78 and apertures 82 are three in number. As most particularly shown in the cross-sectional view of FIG. 5, the male portions 78 are each formed to include an enlarged end 84 to cooperate with a lip 86 formed within the apertures 82. The openings defining each of the apertures 82 includes a chamfered surface 88 to facilitate insertion of the male portions 78.

Turning to FIG. 8, a side view of a seat belt webbing guide 10' constructed in accordance with an alternative embodiment of the present invention is illustrated. Elements between the alternative embodiment and the preferred embodiment of FIGS. 1–7 are identified in FIG. 8 with common reference numerals. The alternative embodiment 10' differs from the preferred embodiment 10 in that the opening 66 is defined by a fixed arm 90 having a general U-shaped and a pair of dependent segments 92 and 94. One of the dependent segments 92 extends from a junction 96 between the mounting portion 50 and the fixed arm 90 and the other segment 94 extends from the other end of the fixed arm 90. The distal ends 98 of the dependent segments are spaced apart to define a gap 100 for permitting the seat belt webbing guide 26 to be introduced into and withdrawn from the opening 66.

In both the preferred embodiment and the alternative embodiment, the seat belt webbing guides 10 and 10' are unitarily molded of plastic. The molded position of the guide 10 is shown in the side view of FIG. 4. Alternatively, it will be understood that any other suitable material may be utilized.

While the above description constitutes the preferred embodiment of the invention, it will be appreciated that the invention is susceptible to modification, variation, and change without departing from the proper scope or fair meaning of the accompanying claims.

We claim:

1. An apparatus guiding a seat belt webbing in combination with a vehicle seat, the vehicle seat including a head rest interconnected to a seat back through a pair of vertical posts, the apparatus comprising:

a mounting portion for interconnecting the apparatus to the vehicle seat, said mounting portion including an aperture receiving one of the pair of vertical posts such that pivotal movement of said apparatus is permitted about said one of the pair of vertical posts; and a guide portion interconnected to said mounting portion, said guide portion defining an opening for receiving the seat belt webbing.

2. The apparatus of claim 1, further including a movable arm movable between a first position permitting insertion and withdrawal of the seat belt webbing guide relative to the opening and a second position for preventing withdrawal of the seat belt webbing from the opening.

3. The apparatus of claim 2, wherein said movable arm is pivotally movable between said first and second positions.

4. The apparatus of claim 3, further comprising a living hinge for permitting said movable arm to move between said first position and said second position.

5. The apparatus of claim 1, further comprising a fixed arm which cooperates with said movable arm to define said opening, said first end of said fixed arm interconnected to a first arm of said movable arm through a living hinge.

6. The apparatus of claim 5, wherein one of said fixed arm and said movable arm includes a plurality of male portions and the other includes a corresponding plurality of female portions adapted to releasably receive said plurality of male portions for retaining said movable arm in said closed position.

7. The apparatus of claim 1, wherein the apparatus is unitarily constructed of plastic.

8. The apparatus of claim 1, wherein said guide portion defines a gap for permitting insertion of the seat belt webbing into and from the opening.

9. The apparatus of claim 8, wherein said guiding portion includes a generally U-shaped fixed arm and a pair of dependent segments extending from opposite ends of said fixed arm toward one another.

10. The apparatus of claim 9, wherein each of said dependent segments is spaced apart from and parallel to a portion of said fixed arm.

11. An arrangement for restraining an occupant of a motor vehicle, the arrangement comprising:

a vehicle seat having a head rest attached to a seat back through a pair of vertical posts;

a seat belt webbing including a shoulder belt section; and a seat belt webbing guide for guiding said shoulder belt section, said seat belt webbing guide including a mounting portion and a guide portion, said mounting portion having an aperture receiving one of the pair of vertical posts of the vehicle seat such that said seat belt webbing guide may pivot about said one of the pair of vertical posts, said guide portion interconnected to said mounting portion, said guide portion defining an opening for receiving the seat belt webbing, said opening partially defined by a movable arm movable between a first position permitting insertion and withdrawal of the seat belt webbing guide relative to the opening and a second position for preventing withdrawal of the seat belt webbing from the opening, said guide portion further including a fixed arm and a living hinge interconnecting said movable arm and said fixed arm.

12. The arrangement for restraining an occupant of a motor vehicle of claim 11, further comprising a fixed arm which cooperates with said movable arm to define said opening, a first end of said fixed arm interconnected to a first arm of said movable arm through a living hinge.

13. The arrangement for restraining an occupant of a motor vehicle of claim 11, wherein the apparatus is unitarily constructed of plastic.

\* \* \* \* \*